(12) United States Patent
Tosic et al.

(10) Patent No.: US 9,092,890 B2
(45) Date of Patent: Jul. 28, 2015

(54) OCCLUSION-AWARE RECONSTRUCTION OF THREE-DIMENSIONAL SCENES FROM LIGHT FIELD IMAGES

(71) Applicants: Ivana Tosic, Berkeley, CA (US);
Yenting Lin, Los Angeles, CA (US);
Kathrin Berkner, Los Altos, CA (US)

(72) Inventors: Ivana Tosic, Berkeley, CA (US);
Yenting Lin, Los Angeles, CA (US);
Kathrin Berkner, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 102 days.

(21) Appl. No.: 13/723,069

(22) Filed: Dec. 20, 2012

(65) Prior Publication Data

US 2014/0176540 A1 Jun. 26, 2014

(51) Int. Cl.
*G06T 17/00* (2006.01)
*G06T 7/00* (2006.01)

(52) U.S. Cl.
CPC ............... *G06T 17/00* (2013.01); *G06T 7/0065* (2013.01); *G06T 2200/21* (2013.01); *G06T 2207/10052* (2013.01)

(58) Field of Classification Search
USPC ........................................ 345/419, 420, 422
See application file for complete search history.

(56) References Cited

U.S. PATENT DOCUMENTS

| | | | | |
|---|---|---|---|---|
| 6,856,314 | B2* | 2/2005 | Ng | 345/421 |
| 7,633,511 | B2* | 12/2009 | Shum et al. | 345/628 |
| 8,077,988 | B2 | 12/2011 | Donoho | |
| 8,165,215 | B2 | 4/2012 | Aharon et al. | |
| 8,761,534 | B2 | 6/2014 | Shroff et al. | |
| 2004/0184655 | A1* | 9/2004 | Ziegler et al. | 382/154 |
| 2006/0239336 | A1 | 10/2006 | Baraniuk et al. | |
| 2008/0228446 | A1* | 9/2008 | Baraniuk et al. | 702/189 |
| 2009/0052767 | A1* | 2/2009 | Bhalerao et al. | 382/154 |
| 2012/0050562 | A1 | 3/2012 | Perwass et al. | |
| 2012/0163672 | A1* | 6/2012 | McKinnon | 382/106 |
| 2013/0089151 | A1 | 4/2013 | Do et al. | |
| 2013/0216124 | A1 | 8/2013 | Shroff et al. | |
| 2013/0216125 | A1 | 8/2013 | Shroff et al. | |
| 2013/0300912 | A1 | 11/2013 | Tosic et al. | |

FOREIGN PATENT DOCUMENTS

| | | |
|---|---|---|
| EP | 1978754 A3 | 10/2008 |
| EP | 2375746 A1 | 10/2011 |
| WO | WO 2010/120591 A1 | 10/2010 |

OTHER PUBLICATIONS

Babacan, S. D. et al., "Compressive Sensing of Light Fields," in Proceedings of the IEEE International Conference on Image Processing, 2009, pp. 2337-2340.
Candes, E.J. et al., "An Introduction to Compressive Sampling", IEEE Signal Processing Magazine, Mar. 2008, pp. 21-30.
(Continued)

*Primary Examiner* — Maurice L McDowell, Jr.
(74) *Attorney, Agent, or Firm* — Fenwick & West LLP

(57) ABSTRACT

A three-dimensional scene is modeled as a set of layers representing different depths of the scene, and as masks representing occlusions of layers by other layers. The layers are represented as linear combinations of atoms selected from an overcomplete dictionary. An iterative approach is used to alternately estimate the atom coefficients for layers from a light field image of the scene, assuming values for the masks, and to estimate the masks given the estimated layers. In one approach, the atoms in the dictionary are ridgelets oriented at different angles, where there is a correspondence between depth and angle.

20 Claims, 4 Drawing Sheets

(56) References Cited

OTHER PUBLICATIONS

Candes, E. et al., "Ridgelets: A Key to Higher-Dimensional Intermittency?" Philosophical Transactions of the Royal Society of London. Series A: Mathematical, Physical and Engineering Sciences, 1999, pp. 2495-2509, vol. 357, No. 1760.

Candes, E. J. et al., "Stable Signal Recovery from Incomplete and Inaccurate Measurements," Communications on Pure and Applied Mathematics, 2006, pp. 1207-1223, vol. 59, No. 8.

Duarte-Carvajalino, J. et al., "Learning to Sense Sparse Signals: Simultaneous Sensing Matrix and Sparsifying Dictionary Optimization," IEEE Transactions on Image Processing, Jul. 2009, pp. 1395-1408, vol. 18, No. 7.

Elad, M. "Optimized Projections for Compressed Sensing," Signal Processing, IEEE Transactions on, Dec. 2007, pp. 5695-5702, vol. 55, No. 12.

Friedman, J. et al., "A Note on the Group Lasso and a Sparse Group Lasso," Arxiv preprint arXiv, Feb. 11, 2010, pp. 1-8.

Gelman, A. et al., "Layer-Based Sparse Representation of Multiview Images," EURASIP Journal on Advances in Signal Processing, 2012, p. 61, vol. 2012, No. 1.

Gleichman, S. et al., "Blind Compressed Sensing," Information Theory, IEEE Transactions on, Oct. 2011, pp. 6958-6975, vol. 57, No. 10.

Hillar, C. et al., "Deciphering Subsampled Data: Adaptive Compressive Sampling as a Principle of Brain Communication," in Advances in Neural Information Processing Systems 23, Eds: J. Laerty and C. K. I. Williams and J. Shawe-Taylor and R.S. Zemel and A. Culotta, 2011, pp. 910-918.

Hosseini Kamal, M. et al., "Light Field Compressive Sensing in Camera Arrays," in Proceedings of the IEEE International Conference on Acoustics, Speech, and Signal Processing, 2012, 4 pages.

Lankton, S. et al., "Localizing Region-Based Active Contours," IEEE Transactions on Image Processing, Nov. 2008, pp. 2029-2039, vol. 17, No. 11.

Levin, A. et al., "Linear View Synthesis Using a Dimensionality Gap Light Field Prior," 2010 IEEE Conference on Computer Vision and Pattern Recognition (CVPR), 2010, pp. 1831-1838.

Levoy, M. et al., "Light Field Rendering," Proceedings of the 23rd Annual Conference on Computer Graphics and Interactive Techniques, pp. 31-42, 1996.

Lewicki, M. S. et al., "Probabilistic Framework for the Adaptation and Comparison of Image Codes," J. Opt. Soc. Am. A: Optics, Image Science, and Vision, Jul. 1999, pp. 1587-1601, vol. 16, No. 7.

Ng, R. et al., "Light Field Photography with a Hand-Held Plenoptic Camera," Technical Report CSTR, 2005, pp. 1-11.

Olshausen, B. A. et al., "Emergence of Simple-Cell Receptive Field Properties by Learning a Sparse Code for Natural Images," Nature, Jun. 13, 1996, pp. 607-609, vol. 381, No. 6583, Springer-Verlag New York Inc.

Skretting, K. et al., "Recursive Least Squares Dictionary Learning Algorithm", IEEE Transactions on Signal Processing, Apr. 2010, pp. 2121-2130, vol. 58, No. 4.

Tosic, I. et al., "Dictionary learning," IEEE Signal Processing Magazine, Mar. 2011 pp. 27-38, vol. 28, No. 2.

Tropp, J., "Just Relax: Convex Programming Methods for Identifying Sparse Signals in Noise," IEEE Transactions on Information Theory, Mar. 2006, pp. 1030-1051, vol. 52, No. 3.

Vaish, V. et al., "Using Plane + Parallax for Calibrating Dense Camera Arrays," Proceedings of the 2004 IEEE Computer Society Conference on Computer Vision and Pattern Recognition, CVPR 2004, 2004, pp. 1-8, vol. 1.

Yang, S. et al., "Novel Super Resolution Restoration of Remote Sensing Images Based on Compressive Sensing and Example Patches-Aided Dictionary Learning," in International Workshop on Multi- Platform/Multi-Sensor Remote Sensing and Mapping (M2RSM), 2011, Jan. 2011, pp. 1-6.

\* cited by examiner

OCCLUSION-AWARE RECONSTRUCTION OF THREE-DIMENSIONAL SCENES FROM LIGHT FIELD IMAGES

BACKGROUND OF THE INVENTION

1. Field of the Invention

This invention relates generally to the reconstruction of three-dimensional scenes, for example the reconstruction of such scenes from images captured by a plenoptic imaging system.

2. Description of the Related Art

Light fields have been first introduced in the computer graphics community for representing three-dimensional scenes via multiple views of that scene taken from different viewpoints. In general, the light field of a scene is a seven-dimensional function that contains two-dimensional images (i.e., light field images) of the scene taken from any viewpoint in three-dimensional space, at any wavelength and any time instant. In computer graphics applications, a computer can render the scene from any viewpoint because it has the explicit three-dimensional scene model, including its three-dimensional shape and texture. That is, the computer can render any of the light field images and therefore can also calculate the entire light field of the scene.

Recently, systems have been developed for capturing a four-dimensional light field of three-dimensional scenes. These systems include camera arrays and plenoptic imaging systems. These systems typically capture a four-dimensional light field: two-dimensional images of a scene taken from any viewpoint on a two-dimensional surface (rather than allowing any viewpoint in three-dimensional space), at a certain wavelength (or wavelength band) and time instant. In these systems, the three-dimensional scene information is not explicitly captured. Rather, it is implicitly contained within the pixels of the captured four-dimensional light field. Extracting three-dimensional information from the four-dimensional light field then becomes an inverse problem, which is ill-posed when occlusions are present.

Furthermore, resolving the ambiguities introduced by occlusions and segmenting a light field (or the underlying three-dimensional scene) into components at different depth layers is often a necessary step for subsequent light field processing methods, such as digital filtering of scene parts or synthesis of virtual views from the multi-view image stack. If the scene layers are not properly segmented, the application of classical image processing methods may introduce artifacts around object boundaries.

Thus, there is a need for approaches to handle occlusions when reconstructing three-dimensional scenes from light field data.

SUMMARY OF THE INVENTION

The present invention overcomes the limitations of the prior art by providing a method for reconstructing layers of a three-dimensional scene from light field images of that scene. The three-dimensional scene is modeled as a set of layers representing different depths of the scene, and as masks representing occlusions of layers by other layers. The layers are represented as linear combinations of functions (which will be referred to as atoms) selected from an overcomplete dictionary. An iterative approach is used to alternately estimate the layers and to estimate the masks. In one approach, the atoms in the dictionary are ridgelets oriented at different angles, where there is a correspondence between depth and angle.

Other aspects of the invention include devices, systems applications and methods corresponding to the approaches described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Because of the effect of occlusions, we consider certain prior information on the three-dimensional scene in order to recover the three-dimensional information from the light field. We use sparse priors. These priors assume that a light field image is a linear combination of a few basic functions (called atoms) selected from a large overcomplete dictionary of atoms. However, light rays do not combine linearly around occlusions. Accordingly, we define a nonlinear sparse representation model for light fields. These models are based on layers and masks. The layers correspond to different depths in the scene and the masks define the spatial extent of objects within each layer.

Figure 1:
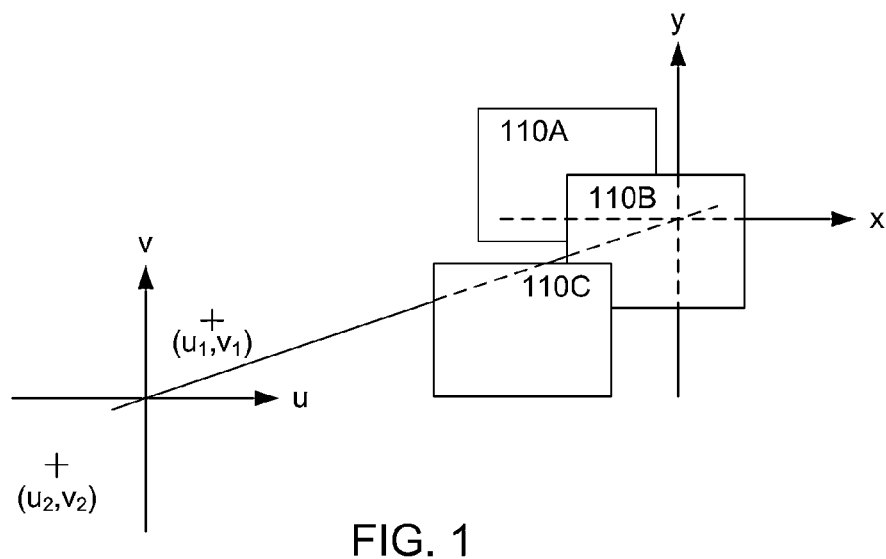
FIG. 1 is a diagram illustrating occlusion in a three-dimensional scene.

In the following example, we express the light field as radiance at any point in space in any given direction. In the absence of occlusions, we can assume that the radiance does not change along the path that the ray traverses. Then, the light field can be parameterized as a four-dimensional function that represents the radiance of a light ray observed at location (u, v), on a given reference surface, and coming from a point source at the location (x, y), as shown in FIG. 1. We denote the light field as $L(u, v, x, y) \equiv L(r)$, where $r \equiv (u, V, x, y)$.

FIG. 1 shows three objects 110A-C. FIG. 1 also shows a reference (x,y) plane and a reference (u,v) plane. Two points $(u_1,v_1)$ and $(u_2,v_2)$ are also shown. The (u,v) plane can be thought of as an observer plane. The light field image $L(u_1, v_1, x, y)$ is the image that would be seen by an observer located at position $(u_1,v_1)$. It can be thought of as the image that would be captured by a pinhole camera where the pinhole is located at position $(u_1,v_1)$. Similarly, the light field image $L(u_2, v_2, x, y)$ is the image that would be seen by an observer located at position $(u_2, v_2)$. In FIG. 1, the (x,y) plane is drawn in object space but it is more appropriately thought of as a universal coordinate system defined in image space. It is universal in the sense that all light field images are defined relative to a common (x,y) coordinate system.

If there were no occlusions, then the total light field would be the sum of the contributions from each object. However, when multiple objects that occlude each other are present in the scene, rays coming from points on different objects do not combine linearly. In FIG. 1, object 110C is forward of object 110B, which is forward of object 110A. If these objects are opaque, then for certain viewpoints, one object may occlude another.

To address this situation, the three-dimensional scene is quantized into layers $\mathcal{O}$ at different depths. Let $L_i(r)$ be the light field produced by layer $\mathcal{O}$ in the absence of occlusions. For convenience, $L_i(r)$ may be referred to as the layer light field and $L(r)$ as the scene light field to distinguish the two. The scene light field $L(r)$ accounts for all layers and is a non-linear function: $L(r)=f(L_1(r), L_2(r), \ldots)$. Now consider a discretized model of the scene where layers and the objects in those layers exist at discrete depths, $z=\{z_1, z_2, \ldots, z_k\}$, where $z_i \leq z_j$ if $i \leq j$ and k is the total number of layers. Assume that layer $\mathcal{O}$ is in front of layer $\mathcal{O}_j$, i.e., that $z_i \leq z_j$. The relative term "forward layer" will be used to refer to a layer that is in front of another layer and "backward layer" to refer to a layer that is behind another layer. In FIG. 1, object 110B is forward of 110A and backward of 110C. Rays from the backward layer $\mathcal{O}_j$ may be occluded by the forward layer $\mathcal{O}$ and only some of the rays from the backward layer may reach the reference surface. We model this by defining mask $M_i$ for layer $\mathcal{O}$. Mask $M_i$ represents the occlusion by layer $\mathcal{O}$ of rays coming from backward layer $\mathcal{O}_j$. Using these masks, we define the multi-layer light field model as:

$$L(r) = L_1(r) + [1-M_1(r)]L_2(r) + [1-M_1(r)][1-M_2(r)]L_3(r) + \ldots = \quad (1)$$

$$L_1(r) + \sum_{i=2}^{k} \left( \prod_{j=1}^{i-1} [1-M_j(r)] \right) L_i(r)$$

where $$M_i(r) = \begin{cases} 1 & \text{if layer } \mathcal{O}_i \text{ occludes}(x, y) \text{when seen from viewpoint}(u, v) \\ 0 & \text{otherwise} \end{cases}$$

There are k layers and (k−1) masks. In this example, we have defined the masks as binary. Note, however, that we can also define its values to be continuous in the interval (0, 1) (i.e., grayscale), which would extend this model to the case of semitransparent objects.

Next, we model the layer light field $L_i(r)$ as a linear combination of functions (atoms) $\phi_m$ selected from an overcomplete dictionary $\mathcal{D} = \{\phi_m\}_{m=0,1,\ldots,M}$. That is, $$L_i(r) = \sum_m c_m^{(i)} \phi_m(r), \quad (2)$$

$$i = 1, 2, \ldots, k$$

When the dictionary is overcomplete, there are infinitely many solutions for a set of atom coefficients $c_m$. However, when dictionary atoms are well adapted to the signal structure, we can look for the sparse solution where just a few coefficients are different from zero. The sparsity assumption will be our prior in solving the following problem.

Problem: Given a scene light field $L(r)$, for example obtained from a plenoptic imaging system or a camera array, estimate the layer light field $L_i(r)$ for all layers $i=1, \ldots, k$ and corresponding mask $M_i(r)$ for layers $i=1, \ldots, (k-1)$. Since $L_i(r) = \sum_m c_m^{(i)} \phi_m(r)$, estimating $L_i(r)$ reduces to estimating $c_m^{(i)}$, $m=1, \ldots, M$.

Figure 2A:
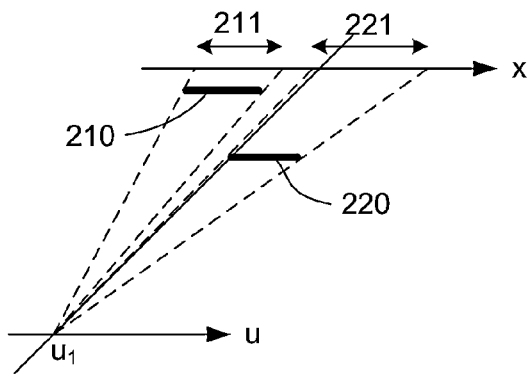
FIGS. 2A-2C are diagrams illustrating two objects viewed from three different viewpoints.

In order to solve this problem we prefer a dictionary $\mathcal{D}$ that well represents the structure of the light field. If we look at some examples of two-dimensional slices (u,x) of light fields, as shown in FIGS. 2A-2D, we can see a line structure inherent to the property of straight line propagation of light. For clarity, FIGS. 2A-2D are a two-dimensional example using coordinates (u,x) rather than the full four dimensions (u,v,x,y). FIG. 2A shows two objects 210 and 220 which are at different depths. Object 220 is forward of object 210. It may or may not occlude object 210, depending on the viewpoint u.

Figure 2B:
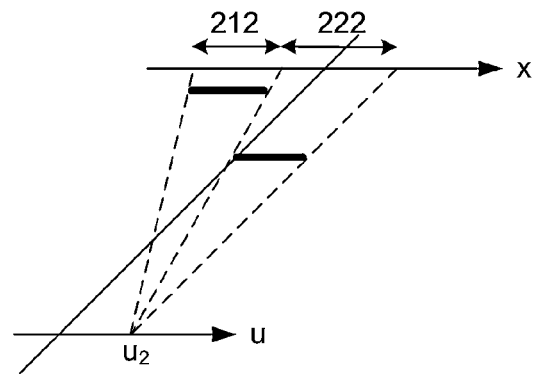
Figure 2C:
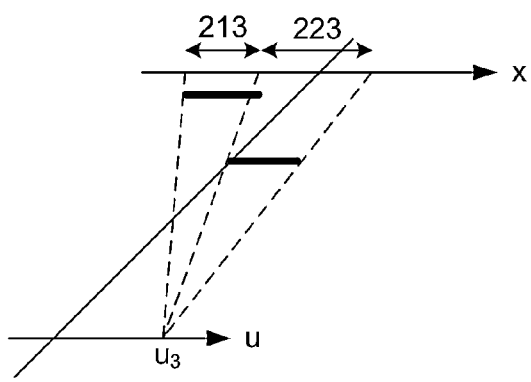
Figure 2D:
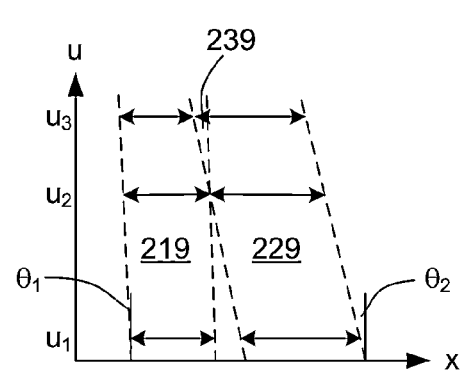
FIG. 2D is a diagram illustrating a (u,x) slice of the corresponding light field.

FIG. 2A is taken from viewpoint $u_1$. From this viewpoint, object 210 occupies the x interval 211 and object 220 occupies the x interval 221. The two intervals 211 and 221 do not overlap and there is no occlusion. FIG. 2D shows a two-dimensional (u,x) slice of the scene light field for the scene with these two objects. The x-slice of FIG. 2A is marked by $u_1$ on the vertical u axis. The two intervals 211 and 221 are reproduced as the two line segments at coordinate $u=u_1$ in FIG. 2D. FIG. 2B shows the same two objects from a different viewpoint $u_2$. From this viewpoint, object 210 occupies the x interval 212 and object 220 occupies the x interval 222. This is also shown by the two line segments at coordinate $u=u_2$ in FIG. 2D. Note that there is a shift of these segments with respect to the segments at coordinate $u=u_1$. This relative shift due to viewpoint change is called the parallax. In FIG. 2B, the two x intervals 212 and 222 are just touching. FIG. 2C shows the two objects from viewpoint $u_3$. Here, object 210 occupies the x interval 213 and object 220 occupies the x interval 223, as also shown by the two line segments at $u=u_3$ in FIG. 2D. The two x intervals 213 and 223 are overlapping, which means that object 220 occludes part of object 210. The occluded region is the area of overlap. Repeating this process for other viewpoints u results in the two bands 219 and 229 shown in FIG. 2D. The area of overlap 239 represents the occlusion of object 210 by object 220.

From FIG. 2D, we see an inherent line structure. That is, each point in an object creates a line in the (u,x) plane. Furthermore, each line forms an angle θ with respect to the normal to the x axis. These angles are labeled $\theta_1$ and $\theta_2$ in FIG. 2D. In the general four-dimensional case, these angles would be with respect to the normal to the (x,y) plane. For convenience, the angle θ will be referred to as the parallax angle. The parallax angle θ depends on the depth location of the object. Due to parallax, objects that are closer to the depth location of the x reference plane produce more vertical lines (i.e., smaller parallax angle θ). Band 219, which corresponds to object 213 which is closer to the x axis, is more vertical and has a lower parallax angle θ. Band 229, which corresponds to object 223 which is farther from the x axis, is more slanted and has a larger parallax angle θ.

This kind of signal structure can be well represented by "ridgelets" at different orientations. Ridgelets are filters that are wavelets in one dimension and constant functions in the other dimension. Because the angle of rays in the light field is directly related to the depth of the object from which the light ray originates, objects in different layers will be represented with ridgelets oriented along different angles θ. Note that the ridgelet choice for a dictionary is not mandatory. One can choose, design, or learn a different dictionary to use with the proposed model. However, different atoms in a dictionary preferably have different angles (or other depth-dependent features), such that we can assign them to different depth layers. Likewise, one can design a dictionary that is also based on the optical system used for acquisition. For example, in plenoptic cameras the lines of different parallax angles θ (corresponding to objects in different depths) are blurred in different ways due to defocus. If we know the blurring kernel for rays at each parallax angle θ (i.e., at each depth), we can incorporate this knowledge within the dictionary design.

One approach to solving the problem stated above is based on linear relaxation. Since we consider discrete light fields in this example, we modify the notation in the following way: $L_i(r) \to l_i$, $M_i(r) \to M_i$, where $l_i$ is a vector with light field samples for layer i and $M_i$ is a diagonal matrix with $M_i(r)$ samples on the diagonal. For simplicity, we will consider a scene whose objects lie in two layers, but the algorithm generalizes to any number of layers. We discretize the whole 3D volume into N possible layers, but assume that the observed scene occupies only k layers, where k<<N. Let us denote the indexes of layers corresponding to objects in our example scene as layers p and q. Therefore, object 1 lies in the layer of index p, and object 2 lies in the layer indexed by q. The model of Eqn. (1) then becomes:

$$l = l_1 + (I - M_1)l_2 = Rc_p + Rc_q + e \quad (3)$$

where R is the dictionary matrix and $c_p$, $c_q$ are sparse coefficient vectors. We have also introduced $e = -M_1 I_2$ as a term that represents the occlusions. Since occlusions are typically sparse in the pixel domain, we can design an algorithm that finds both sparse coefficients and sparse occlusions (i.e., estimates occlusions in the light field).

Now rearrange the vectors in R such that atoms with the same orientations, i.e., with the same parallax angle θ, belong to the same block of columns, i.e., $R = [R_{\theta_1}, R_{\theta_2}, \ldots, R_{\theta_N}]$. Thus, in each block $R_{\theta_i}$ have atoms with orientation $\theta_i$, but with different scales and positions. Since each layer has a different parallax angle θ, we can denote coefficient vectors for each of the layers as: $c_1, c_2, \ldots, c_N$, where each $c_i$ vector has non-zero elements corresponding to atoms with $\theta_i$ orientation and all other elements are zero. We can then aggregate these vectors into $c = c_1 + c_2 + \ldots + c_N$. Since we assume that an object can only exist in a few different depths, this implies that only a few of the coefficient vectors $c_i$ in the sum will be different from zero, i.e., that the coefficient vector c will have group sparsity. In the example above, only groups corresponding to the layer p (object 1) and layer q (object 2) $c_i$ will have non-zero values. These groups consist of atoms whose parallax angles θ correspond to the depth of objects in the scene.

Group sparsity is defined as follows. A vector is considered "sparse" if the number of its non-zero elements is much smaller than its dimension. Assume we group the elements of a vector into N groups and evaluate the Euclidean norm of each group. The vector is "group sparse" if the number of groups with non-zero Euclidean norm is much smaller than the total number of groups. Group norm is the sum of Euclidean norms of all groups.

Figure 3:
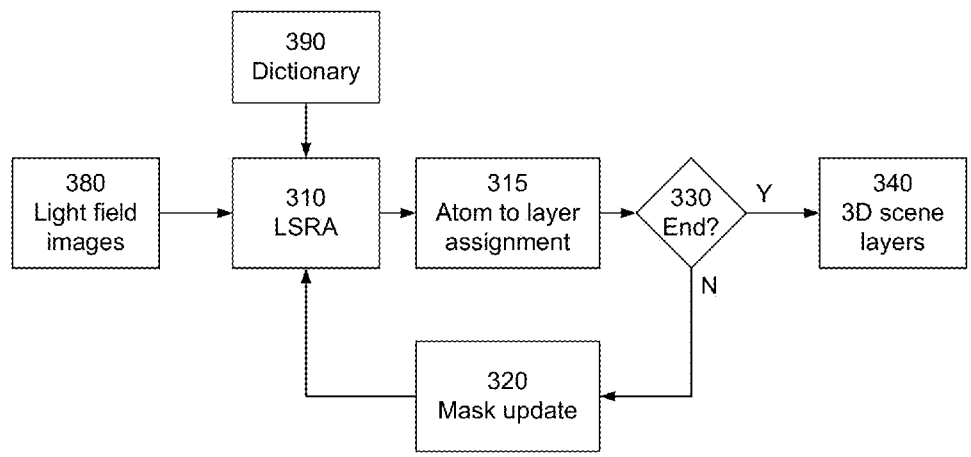
FIG. 3 is a flow diagram of an iterative method for reconstructing layers of a three-dimensional scene from a light field.

FIG. 3 is a flow diagram of an iterative algorithm to recover the layers and corresponding masks from light field images. In FIG. 3, the light field, which includes a number of light field images 380 taken from different viewpoints, is captured by some device, for example a plenoptic imaging system or a camera array. A dictionary 390 is also determined, for example as described above. FIG. 3 then has two basic steps. In step 310, the masks are held constant and the layer light fields $l_i$ are estimated. In step 320, the masks are estimated. The two steps are iterated until some stopping point 330, for example when an error metric falls below an acceptable level or when a maximum number of iterations is reached. Once the iteration stops 330, the three-dimensional scene is estimated 340 using Eqn. (1) above.

In one example of step 310, from the previous discussion, we can assume the occlusion vector e is sparse, and the ridgelet coefficients c also have a "group sparse" behavior. Thus, after relaxing the problem into a linear formulation we can define our objective function using two regularization terms: 1) group norm $\sum_{i=1}^{N} \|c_i\|_2$ to impose group sparsity of ridgelet coefficients, and 2) $\|e\|_1$ to impose sparsity on the occlusion error. The optimization problem is thus:

$$\min_{c,e} \left( \|1 - Rc - e\|_2^2 + \lambda_1 \sum_{i=1}^{N} \|c_i\|_2 + \lambda_2 \|e\|_1 \right) \quad \text{(LSRA)(4)}$$

where $\lambda_1$ and $\lambda_2$ are regularization parameters. Solving this objective with respect to c and e gives us a solution to the inverse problem with minimum group norm $\Sigma \|c_i\|_2$ and $l_1$ norm of occlusion error $\|e\|_1$. We will refer to this optimization as LSRA, which stands for Layered Sparse Reconstruction Algorithm.

After we get the result from the previous step 310, we can estimate 315 which atoms correspond to which layers. We can estimate the first layer by looking at the group norm $\|c_i\|_2$. Because of the parallax, we know that a larger angle of rays implies a shorter distance to the object. Without loss of generality, we can order the coefficients $c_i$ by their corresponding angle $\theta_i$, $|\theta_i| \geq |\theta_j|$ if $i \geq j$.

To define how many layers exist in our scene, we use the Gaussian mixture model (GMM) to fit the group norm $\|c_i\|_2$ and choose the number of layers as the regularization term. We chose GMM because of its simplicity, but other clustering algorithms can be used as well. After we retrieve the GMM parameters, we define the region of interest for the first layer by the mean $\bar{c}^1$ and variance $\text{var}(c^1)$ as $[\bar{c}^1 - \text{var}(c)^1, \bar{c}^1 + \text{var}(c)^1]$. This region of interest can span one or more layers in our grid of N layers, depending on the granularity of discretization. In general, the region spans layers within the interval $[\theta_L^1, \theta_U^1]$ obtained from the GMM clustering. Then we can define the estimation of the light field for the first layer by $$\hat{l}_1 = R_{74_p} c_p \quad (5)$$

where $\theta_p \in [\theta_L^1, \theta_U^1]$. For our two-layer scene example, this interval would include the layer p, plus some neighboring layers due to noise in the data.

In step 320, we use image segmentation in the reconstructed view to recover the boundary of objects in layers and to define the mask. In this example, we apply a region-based segmentation method (e.g. active contour) to get the segments of the objects in layer $\mathcal{O}$, denoted as $\mathcal{S}(\mathcal{O})$. We define the mask $M_1$ based on the evaluated segments $S(\mathcal{O})$, i.e., the mask is non-zero for points in the segments $S(\mathcal{O})$.

Now we can use the mask information to modify the sparse recovery in Eqn (4). Since masking the light field is equivalent to masking the corresponding ridgelets we have:

$$[I - M_1]l_2 = [I - M_1]Rc_q = \tilde{R}c_q \quad (6)$$

where $$\tilde{R} = [\tilde{R}_{\theta_1}, \tilde{R}_{\theta_2}, \ldots, \tilde{R}_{\theta_N}],$$

and $$\tilde{R}_{\theta_i} = \begin{cases} R_{\theta_i} & \text{if } |\theta_i| \geq |\theta_U^1| \\ (1 - M_1)^t R_{\theta_i} & \text{if } |\theta_i| < |\theta_L^1| \end{cases}$$

Thus, our second round of optimization can be written as:

$$\min_{c,e}\left(\left\|1 - \hat{1}_1 - \tilde{R}c - e\right\|_2^2 + \lambda_1 \sum_{i=1}^{N} \|c_i\|_2 + \lambda_2 \|e\|_1\right) \quad (\text{LSRA-mod})(7)$$

where LSRA-mod stands for modified LSRA. Therefore, the second layer takes into account the occlusions generated by the first layer and refines the second layer accordingly. These steps can be extended to multiple layers.

We iteratively run these steps until the stopping criterion is satisfied. In this example, either the maximum iterations are reached or the occlusion error is smaller than a threshold $\|e\|_1 \leq \tau$.

Figure 4A:
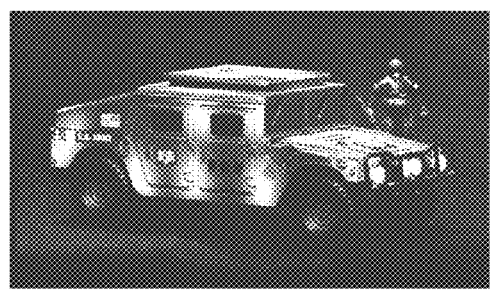
FIGS. 4A-4B are two light field images of a three-dimensional scene.
Figure 4B:
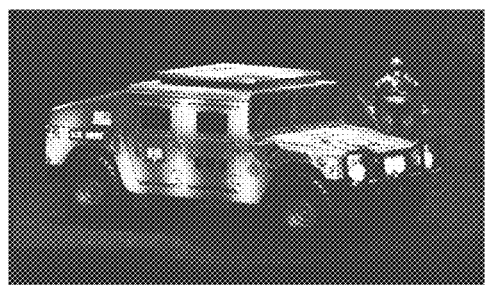

FIGS. 4-5 demonstrate an application of our method on multi-layer three-dimensional scene segmentation from light field data. We ran the experiment on data from the Stanford light field archive. This light field was acquired using a single camera on a computer controlled gantry with total of 256 views on a 16 by 16 grid. For reconstruction, we used 16 views of this scene where the light field images are captured with the same vertical position and shifted in the horizontal axis. Two example light field images from the dataset are shown in FIGS. 4A and 4B. We can see that the Humvee is forward since it has more parallax (shift between the images) than the soldier.

As mentioned before, closer objects typically will have larger parallax and thus their ridgelets will have a larger angle for a reference (x,y) plane that is farther away. Then we look at the group norm of the ridgelet coefficients $\|c_i\|z$ and fit with Gaussian mixture model. Thus, by choosing number of layers as a regularization, we can separate the light field into two parts:

$$l = Rc = Rc_\rho + Rc_\omega = l_1 + l_2 \quad (8)$$

where $c_\rho$ and $c_\omega$ have non-zero entries for atoms with orientations $|\theta| > \theta_c$ and $|\theta| \leq \theta_c$, respectively.

Figure 5A:
FIGS. 5A-5B are images of a reconstructed front layer and back layer of the scene shown in FIG. 4.
Figure 5B:
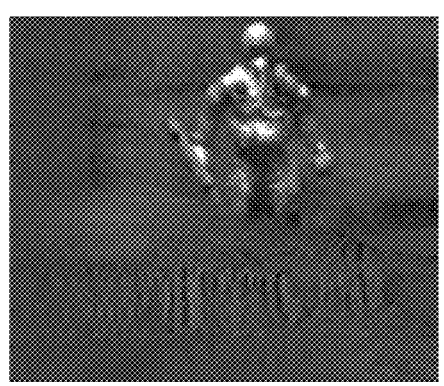

After we separate the light field into two parts, we can recover the object in different layers. FIG. 5A shows the front layer and FIG. 5B shows the back layer. Note that this is different from refocusing. In refocusing, in FIG. 5A, the humvee would be visible but the soldier in the background would also be present but blurred. In depth segmentation, FIG. 5A shows only those components at the near depth so the background soldier is eliminated, rather than blurred.

Figure 6A:
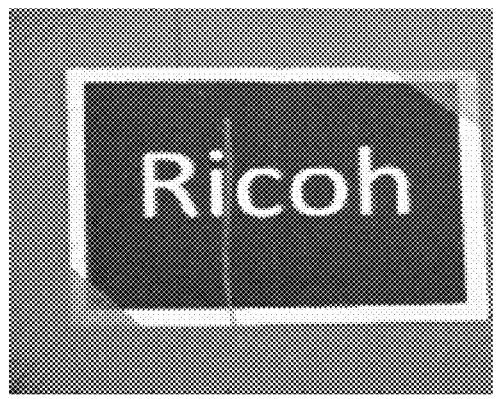
FIGS. 6A-6B are two light field images of another three-dimensional scene.
Figure 6B:
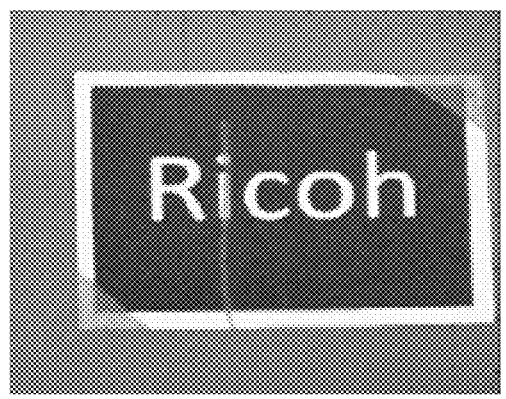
Figure 7A:
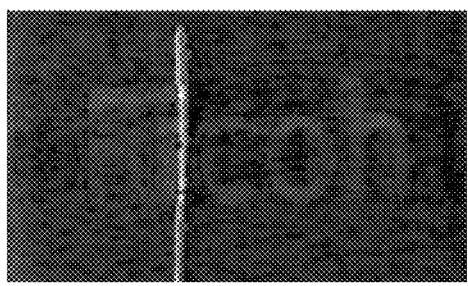
FIGS. 7A-7B are images of a reconstructed front layer and back layer of the scene shown in FIG. 6.
Figure 7B:

FIGS. 6-7 show another example. This experiment was run using light field images captured by a plenoptic camera. Six images were captured. FIGS. 6A-6B shows two of the captured images. The long narrow object is in front of "Ricoh," as is apparent from the parallax shift. FIG. 7A shows the front layer and FIG. 7B shows the back layer after reconstruction.

Besides depth segmentation, the approach described above can be also used for many applications that necessitate per-layer light field processing, such as digital refocusing, view interpolation, volume rendering, etc.

Figure 8:
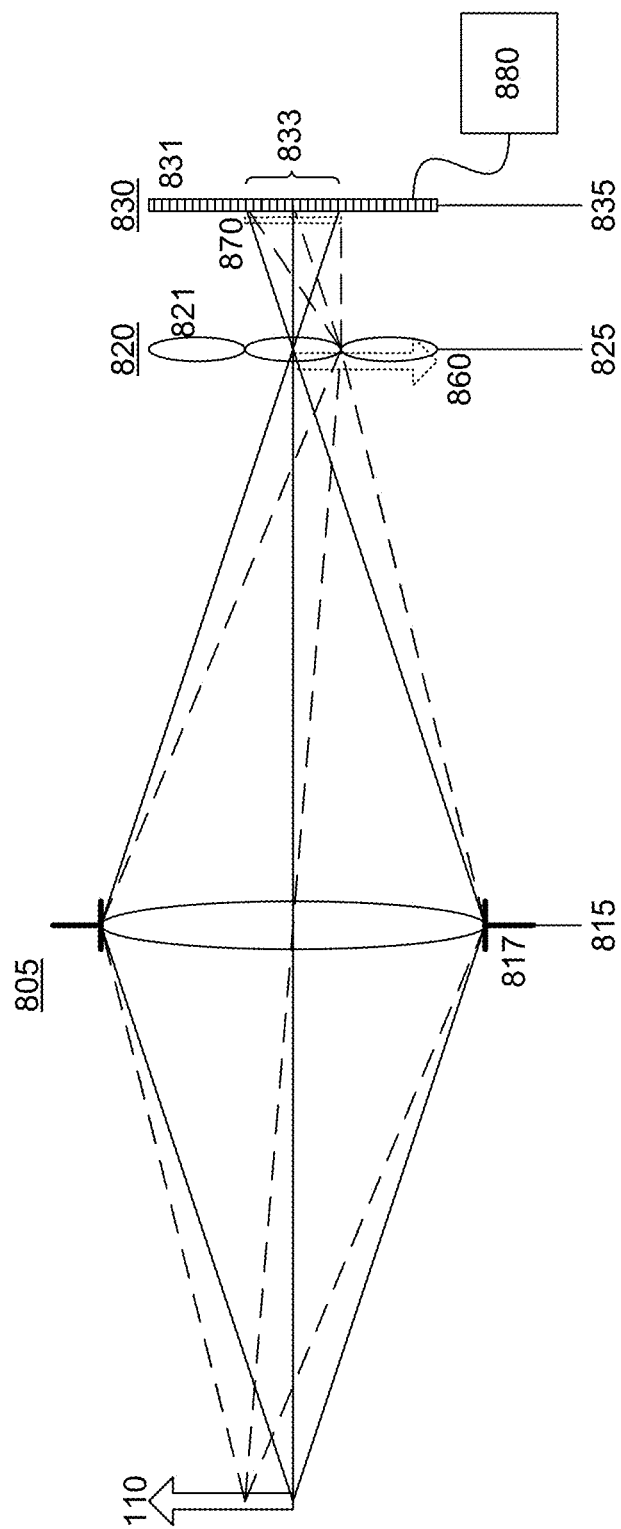
FIG. 8 is a diagram of a plenoptic imaging system.

FIG. 8 is a diagram of a plenoptic imaging system that incorporates the approach described above. The system captures a plenoptic image of the scene 110. The plenoptic imaging system includes an image-forming optical module 805, which in FIG. 8 is represented by a single lens element although it is understood that the optical module 805 could contain multiple elements and/or non-lens elements (e.g., mirrors). The optical module 805 forms a conventional optical image 860 of scene 110. The optical module 805 may also be referred to as the primary imaging module, subsystem or system. The optical image 860 is formed at an image plane 825 of the optical module 805. The optical module 805 is characterized by a pupil 817 and pupil plane 815, which in FIG. 8 is represented by a physical aperture stop co-located with the single lens element. In more complex optical modules 805, the pupil 817 and pupil plane 815 need not be co-located with any of the optical elements within the optical module.

In a conventional imaging system, a detector array would be located at image plane 825 to capture the optical image 860. However, this is not the case for the plenoptic imaging system in FIG. 8. In this particular example, an array 820 of micro-imaging elements 821 is located at the image plane 825. In FIG. 8, the micro-imaging elements 821 are shown as microlenses. Other elements can also be used, for example, an array of pinholes. The detector array 830 is located behind (i.e., optically downstream of) the micro-imaging array 820. More specifically, the detector array 830 is positioned in a conjugate plane 835 to the pupil plane 815. That is, each micro-imaging element 821 creates an image of the pupil plane 815 at the conjugate plane 835, which image is captured by the detector array 830.

In the case of microlenses, each microlens 821 forms an image 870 of the pupil at the detector plane 835. The image of the pupil is captured by a subset of detectors 831 in the detector array 830. Each microlens 821 forms its own image 870. Thus, the overall plenoptic image formed at detector plane 835 will include an array of images 870, one for each microlens 821. This arrayed imaging effectively subdivides the detector array into superpixels 833, each of which contains multiple detectors 831. Each microlens 821 images the pupil onto the corresponding superpixel 833, with each pupil image then captured by detectors in the corresponding superpixel.

Each detector 831 collects the rays that travel through a portion of the pupil 817. Each microlens 821 collects the rays that originate from a portion of the scene 110. Thus, each detector 831 collects the rays traveling in a certain direction from a portion of the scene 110. That is, each detector 831 collects a small portion of the overall image of the scene, as taken from a specific viewpoint. By aggregating the data collected by detectors 831 which are operating from the same viewpoint, a complete image of the scene from that viewpoint can be constructed. By aggregating all the images from different viewpoints, a complete light field for the scene can be constructed. In FIG. 8, a processor 880 collects the data from the detector array 830 and processes it accordingly. Processor 880 may also perform the scene segmentation described above.

FIG. 8 shows the capture of a light field by a plenoptic imaging system. As mentioned previously, other types of light field imaging systems can also be used, for example camera arrays.

Although the detailed description contains many specifics, these should not be construed as limiting the scope of the invention but merely as illustrating different examples and aspects of the invention. It should be appreciated that the scope of the invention includes other embodiments not discussed in detail above. For example, the dictionary does not have to be ridgelet-based. It can be any dictionary with a property that different atoms have different orientations. It can also be learned from a light field database, using dictionary learning. Finally, the dictionary can be also adapted to the specific optical properties of the light field imaging system. Image segmentation for obtaining the masks can be also based on other algorithms; active contours is just one example. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for reconstructing a layered form of a three-dimensional scene from a light field of the scene, the method comprising a computer system executing the steps of:

assuming one or more masks, then estimating, based on the scene light field and on the assumed one or more masks, atom coefficients for layer light fields for two or more layers representing different depths of the scene, wherein the layer light fields are represented as linear combinations of atoms selected from an overcomplete dictionary and the linear combinations are weighted by the atom coefficients, and wherein the masks represent the occlusion of backward layers by forward layers;

assuming the layer light fields, then estimating the masks based on the assumed layer light fields;

iteratively performing the steps of estimating atom coefficients for layer light fields and estimating the masks; and estimating layers of a three-dimensional scene from the layer light fields and the masks.

2. The method of claim 1 wherein there are k layers and (k−1) masks, k>1.

3. The method of claim 2 wherein the three-dimensional scene is modeled as:

$$L(r) = L_1(r) + \sum_{i=2}^{k} \left( \prod_{j=1}^{i-1} [1 - M_j(r)] \right) L_i(r)$$

where L(r) is the light field of the scene, $L_i(r)$ is the layer light field of layer i, and $M_i(r)$ is the mask of layer i.

4. The method of claim 1 wherein the scene light field comprises a plurality of light field images taken from different viewpoints, and the atoms are ridgelets oriented at different parallax angles θ relative to a normal of a coordinate system for the light field images.

5. The method of claim 4 wherein layer light fields for layers at different depths correspond to ridgelets at different parallax angles θ.

6. The method of claim 1 wherein the light field of the scene is captured by a light field imaging system, and the overcomplete dictionary accounts for an optical property of the light field imaging system.

7. The method of claim 1 wherein the step of estimating, based on the scene light field and on the assumed one or more masks, atom coefficients for the layer light fields is based on linear relaxation.

8. The method of claim 1 wherein the layer light field $L_i(r)$ for each layer i is represented as $$L_i(r) = \sum_m c_m^{(i)} \phi_m(r),$$
$$i = 1, 2, \ldots, k$$

wherein the $\phi_m$ are the atoms of the overcomplete dictionary $\mathcal{D} = \{\phi_m\}_{m=0,1,\ldots,M}$ and the $c_m^{(i)}$ are the atom coefficients.

9. The method of claim 1 wherein the step of estimating, based on the scene light field and on the assumed one or more masks, atom coefficients for the layer light fields includes a component that estimates occlusions between the layers.

10. The method of claim 1 wherein the step of estimating, based on the scene light field and on the assumed one or more masks, atom coefficients for the layer light fields is based on $$\min_{c,e} \left( \|1 - Rc - e\|_2^2 + \lambda_1 \sum_{i=1}^{N} \|c_i\|_2 + \lambda_2 \|e\|_1 \right)$$

where l is the scene light field, R is the overcomplete dictionary, c are the atom coefficients for combining atoms from the overcomplete dictionary, e is a component that estimates occlusions between the layers, and $\lambda_1$ and $\lambda_2$ are regularization parameters.

11. The method of claim 1 wherein the masks are binary.

12. The method of claim 1 wherein the step of estimating the masks based on the assumed layer light fields uses image segmentation to estimate the masks.

13. The method of claim 1 wherein the light field of the scene is captured by a plenoptic imaging system.

14. The method of claim 1 wherein the light field of the scene is captured by an array of imaging devices.

15. A non-transitory computer readable medium containing instructions for reconstructing a three-dimensional scene from a light field of the scene, the instructions causing a computer system to execute the steps of:
assuming one or more masks, then estimating, based on the scene light field and on the assumed one or more masks, atom coefficients for layer light fields for two or more layers representing different depths of the scene, wherein the layer light fields are represented as linear combinations of atoms selected from an overcomplete dictionary and the linear combinations are weighted by the atom coefficients, and wherein the masks represent the occlusion of backward layers by forward layers;
assuming the layer light fields, then estimating the masks based on the assumed layer light fields;
iteratively performing the steps of estimating atom coefficients for layer light fields and estimating the masks; and
estimating layers of a three-dimensional scene from the layer light fields and the masks.

16. The non-transitory computer readable medium of claim 15 wherein there are k layers and (k−1) masks, k>1, and the three-dimensional scene is modeled as:

$$L(r) = L_1(r) + \sum_{i=2}^{k} \left( \prod_{j=1}^{i-1} [1 - M_j(r)] \right) L_i(r)$$

where L(r) is the light field of the scene, $L_i(r)$ is the layer light field of layer i, and $M_i(r)$ is the mask of layer i.

17. The non-transitory computer readable medium of claim 15 wherein the scene light field comprises a plurality of light field images taken from different viewpoints, and the atoms are ridgelets oriented at different parallax angles θ relative to a normal of a coordinate. system for the light field images.

18. The non-transitory computer readable medium of claim 15 wherein the layer light field $L_i(r)$ for each layer i is represented as $$L_i(r) = \sum_m c_m^{(i)} \phi_m(r),$$
$$i = 1, 2, \ldots, k$$

wherein the $\phi_m$ are the atoms of the overcomplete dictionary $\mathcal{D} = \{\phi_m\}_{m=0,1,\ldots,M}$ and the $c_m^{(i)}$ are the atom coefficients.

19. The non-transitory computer readable medium of claim 15 wherein the step of estimating, based on the scene light field and on the assumed one or more masks, atom coefficients for the layer light fields includes a component that estimates occlusions between the layers.

20. A system for reconstructing a three-dimensional scene from a light field of the scene, the system comprising:
a light field imaging device that captures a light field of the scene; and
a computer system with access to the scene light field, the computer system executing the steps of:
assuming one or more masks, then estimating, based on the scene light field and on the assumed one or more masks, atom coefficients for layer light fields for two or more layers representing different depths of the scene, wherein the layer light fields are represented as linear combinations of atoms selected from an overcomplete dictionary and the linear combinations are weighted by the atom coefficients, and wherein the masks represent the occlusion of backward layers by forward layers;
assuming the layer light fields, then estimating the masks based on the assumed layer light fields;
iteratively performing the steps of estimating atom coefficients for layer light fields and estimating the masks; and
estimating layers of a three-dimensional scene from the layer light fields and the masks.

* * * * *